(12) United States Patent
Martin et al.

(10) Patent No.: US 8,812,272 B2
(45) Date of Patent: Aug. 19, 2014

(54) DESIGNING A MODELED OBJECT WITHIN A SESSION OF A COMPUTER-AIDED DESIGN SYSTEM INTERACTING WITH A DATABASE

(75) Inventors: Nicolas Martin, Paris (FR); Arnaud Nonclercq, Rueil Malmaison (FR)

(73) Assignee: Dassault Systemes, Velizy Villacoublay (FR)

( * ) Notice: Subject to any disclaimer, the term of this patent is extended or adjusted under 35 U.S.C. 154(b) by 50 days.

(21) Appl. No.: 13/229,171

(22) Filed: Sep. 9, 2011

(65) Prior Publication Data

US 2012/0078587 A1      Mar. 29, 2012

(30) Foreign Application Priority Data

Sep. 23, 2010   (EP) ..................................... 10306026

(51) Int. Cl.
G06F 17/50      (2006.01)

(52) U.S. Cl.
CPC ............ G06F 17/50 (2013.01); *G06F 2217/04* (2013.01)
USPC .................... 703/1; 700/97; 700/98; 345/420

(58) Field of Classification Search
CPC .............................. G06F 2217/04; G06F 17/50
USPC ............................ 703/1; 700/97–98; 345/420
See application file for complete search history.

(56) References Cited

U.S. PATENT DOCUMENTS

| | | |
|---|---|---|
| 6,768,928 B1 * | 7/2004 | Nagasawa et al. .............. 700/98 |
| 2009/0182450 A1 | 7/2009 | Goldschmidt |
| 2011/0224813 A1 * | 9/2011 | Takatsuka ....................... 700/97 |

OTHER PUBLICATIONS

Papadakisa, P., et al., "Efficient 3D shape matching and retrieval using a concrete radialized spherical projection representation," Pattern Recognition, 40(9): 2437-2452 (Sep. 2007).
Kazhdan, M., et al."Harmonic 3D Shape Matching," ACM SIGGRAPH Symposium on Computer Animation, p. 191 (Jul. 21, 2002).
Funkhouser, T., et al., "Modeling by Example," *ACM Transactions on Graphics*, 23(3): 652-663 (Aug. 1, 2004).
European Search Report, EP 10306026, Date of Completion of Search Feb. 3, 2011, 8 pages.

* cited by examiner

*Primary Examiner* — Eunhee Kim
(74) *Attorney, Agent, or Firm* — Hamilton, Brook, Smith & Reynolds, P.C.

(57) ABSTRACT

The invention is directed to a method for designing a modeled object within a session of CAD system interacting with a database. The method comprises:
  detecting a designing operation performed by a user and applied to an initial modeled object within the session;
  computing a signature from a set of properties of the initial modeled object and/or a set of properties of the session;
  retrieving in the database modeled objects having the closest signatures to the signature of the initial modeled object within the session;
  displaying representations of modeled objects retrieved;
  selecting by the user a modeled object among the representations of modeled objects displayed; and
  replacing the initial modeled object within the session by the modeled object selected.

15 Claims, 8 Drawing Sheets

DESIGNING A MODELED OBJECT WITHIN A SESSION OF A COMPUTER-AIDED DESIGN SYSTEM INTERACTING WITH A DATABASE

RELATED APPLICATION(S)

This application claims priority under 35 U.S.C. §119 or 365 to European Patent Application No. 10306026.5, filed Sep. 23, 2010.

The entire teachings of the above application(s) are incorporated herein by reference.

TECHNICAL FIELD OF THE INVENTION

The invention relates to the field of computer-aided design, and more specifically to the completion of a scene during a designing session.

BACKGROUND

Computer-aided techniques are known to include Computer-Aided Design or CAD, which relates to software solutions for authoring product design. Similarly, CAE is an acronym for Computer-Aided Engineering, e.g. it relates to software solutions for simulating the physical behavior of a future product. CAM stands for Computer-Aided Manufacturing and typically includes software solutions for defining manufacturing processes and operations.

A number of systems and programs are offered on the market for the design of objects (or parts) or assemblies of objects, forming a product, such as the one provided by Dassault Systèmes under the trademark CATIA. These CAD systems allow a user to construct and manipulate complex three dimensional (3D) models of objects or assemblies of objects. CAD systems thus provide a representation of modeled objects using edges or lines, in certain cases with faces. Lines or edges may be represented in various manners, e.g. non-uniform rational B-splines (NURBS). These CAD systems manage parts or assemblies of parts as modeled objects, which are mostly specifications of geometry. Specifically, CAD files contain specifications, from which geometry is generated, which in turn allow for a representation to be generated. Geometry and representation may be stored in a single CAD file or multiple ones. CAD systems include graphic tools for representing the modeled objects to the designers; these tools are dedicated to the display of complex objects—the typical size of a file representing an object in a CAD system being in the range of one Megabyte per part, and an assembly may comprise thousands of parts. A CAD system manages models of objects, which are stored in electronic files.

In computer-aided techniques, the graphical user interface (GUI) plays an important role as regards the efficiency of the technique.

Also known are Product Lifecycle Management (PLM) solutions, which refer to a business strategy that helps companies to share product data, apply common processes, and leverage corporate knowledge for the development of products from conception to the end of their life, across the concept of extended enterprise. By including the actors (company departments, business partners, suppliers, Original Equipment Manufacturers (OEM), and customers), PLM may allow this network to operate as a single entity to conceptualize, design, build, and support products and processes.

Some PLM solutions make it for instance possible to design and develop products by creating digital mockups (a 3D graphical model of a product). The digital product may be first defined and simulated using an appropriate application. Then, the lean digital manufacturing processes may be defined and modeled.

The PLM solutions provided by Dassault Systèmes (under the trademarks CATIA, ENOVIA and DELMIA) provides an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

Such PLM solutions comprise a relational database of products. The database comprises a set of textual data and relations between the data. Data typically include technical data related to the products said data being ordered in a hierarchy of data and are indexed to be searchable. The data are representative of the modeled objects, which are often modeled products and processes.

A PLM solution, such as the one sold under the name ENOVIA, may automatically capture and manage product information and facilitates the design of object (or parts). For example, the user may wish to design a product, e.g. a braking pedal. A standard CAD tools enable a user to search between parts or products stored. Databases used in PLM systems enable queries to be made on various types of data and relations between parts or product. As a result, the scope of the navigation of the database is the widest possible. In practice, the user can have access to all the parts, products, assemblies processes, people, and, from a general standpoint, any data related to the manufactured goods through their lifecycle.

Nevertheless, databases do usually not allow the user to easily navigate and find an object (or part) since the data do not have a graphical representation. Data are identified by file names or types and those names may not be relevant enough to identify precisely the items that the user is looking for.

For the sake of completeness, a database is defined usually as a collection of data or information organized for rapid search and retrieval, especially by a computer. Databases are structured to facilitate storage, retrieval, modification, and deletion of data in conjunction with various data-processing operations. A database consists of a file or set of files that can be broken down into records, each of which consists of one or more fields. Fields are the basic units of data storage. Users retrieve database information primarily through queries. Using keywords and sorting commands, users can rapidly search, rearrange, group, and select the field in many records to retrieve or create reports on particular aggregates of data according to the rules of the database management system being used.

In general, during the various routine steps of a design session, a user needs to search and find an object. To this aim, the user knows (or is able to identify) the name of the object that is searched. In the contrary case, it is almost impossible for the user to find the object because the object is stored with billions of other objects. In addition, the database can store one or more objects which are unknown to the user and that would better fit to the current designing session of the user.

There is therefore a need for a better optimized process for efficiently searching a relevant object during a design session.

BRIEF SUMMARY OF THE INVENTION

According to a first aspect, the invention is embodied as a method for designing a modeled object within a session of a computed-aided design system interacting with a database, the said method comprising the steps of:

detecting a designing operation performed by a user and applied to an initial modeled object within the session;

computing a signature from a set of properties of the initial modeled object and/or a set of properties of the session;

retrieving from the database modeled objects having the closest signatures to the signature of the initial modeled object within the session;

displaying representations of modeled objects retrieved;

selecting by the user a modeled object among the representations of modeled objects displayed; and replacing the initial modeled object within the session by the modeled object selected.

In embodiments, the method may comprise one or more of the following features:

the steps are repeated for the selected modeled object replacing the initial modeled object;

after the step of computing a signature, a step of indexing in the database the initial modeled object;

an index key of the initial modeled object is the computed signature of the initial modeled object;

the step of detecting a designing operation further comprises detecting a modification of the session;

a step of ranking the modeled objects retrieved from the database;

the ranking is carried out according to the distance between the signature of each retrieved modeled objects with the signature of the initial modeled object;

the representations of modeled objects retrieved are displayed in accordance with the current viewpoint of the initial modeled object;

the representations of modeled objects retrieved are two-dimensional representations that are displayed within a window;

the steps of detecting, computing, displaying, selecting, and replacing are performed on a client host and the steps of indexing, ranking, and retrieving are performed on a server hosting the database;

after the step of selecting a modeled object by the user, the steps of displaying concomitantly the selected modeled object and the initial modeled object, and validating, upon user action, the selection of the selected modeled object;

the selected modeled object is displayed over the initial modeled object and is rendered with a level of transparency;

the selected modeled object has a same orientation as the replaced initial modeled object.

According to another embodiment, the invention is embodied as a computer program, stored on a computer readable medium, for designing a modeled object within a session of CAD system interacting with a database, comprising code means for causing a computer to take the steps of the method of the invention.

According to another embodiment, the invention is embodied as an apparatus for designing a modeled object within a session of CAD system interacting with a database, the apparatus comprising means for implementing the steps of the method of the invention.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

An embodiment of the method according to the invention will now be described, by way of non-limiting example, and in reference to the accompanying drawings, where.

DETAILED DESCRIPTION OF THE EMBODIMENTS

Figure 1:
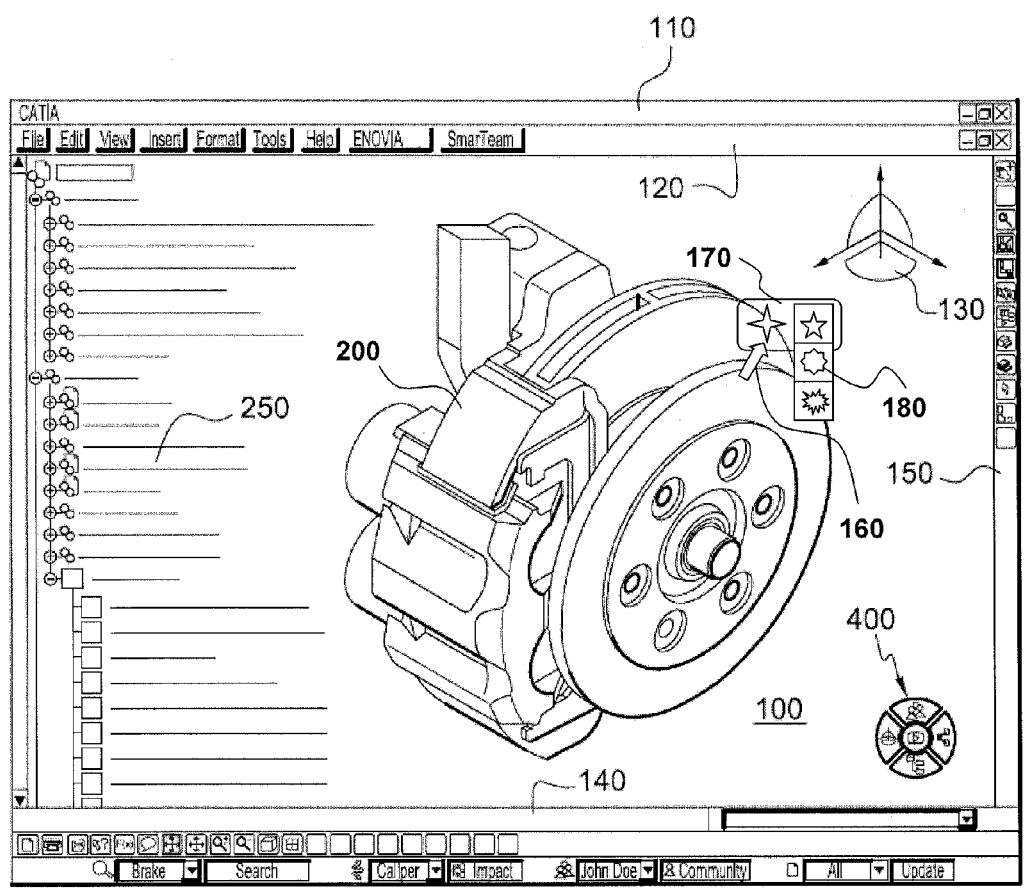
FIG. 1 is a schematic of view of a graphical user interface.

A description of example embodiments of the invention follows.

The teachings of all patents, published applications and references cited herein are incorporated by reference in their entirety.

The invention is directed to a method for designing a modeled object within a session of a computed-aided design system interacting with a database, e.g. a PLM database. A session keeps track of operations performed by the user on the system and provides for the user a working environment with a specific user context. The method according to the invention comprises detecting a designing operation performed by the user, the designing operation being applied to an initial modeled object within the session. Then, a signature is computed from a set of properties of the initial modeled object and/or a set of properties of the session. Next, modeled objects having the closest signatures to the signature of the initial modeled object within the session are retrieved in the database; the closeness of the signature of a modeled object with the signature of the initial modeled object may be determined with the distance between the two signatures. Thus, the modeled objects, whose respective signatures presenting the closest matches with the signature of the initial modeled object, are retrieved in the database. Representations of the modeled objects retrieved in the database are then displayed; the representations may be for instance two-dimensional representations. Subsequently, the user selects a modeled object among the representations of the modeled objects displayed—which amounts to say that the user selects a representation of a modeled object—, and the initial modeled object within the session is replaced by the modeled object selected.

Once the initial modeled object has been replaced by the modeled object selected by the user, the method according to the invention may be repeated so that the selected modeled object is, in turn, replaced by another modeled object selected by the user according to the method of the invention.

Hence, the invention provides a method that allows the completion of a modeled object initially displayed. The modeled object may be a three-dimensional modeled object, and a three-dimensional completion is performed. The user receives in real time the most appropriate modeled objects among the modeled objects stored in a database, that is, the modeled objects having the closest matchings with the initial modeled object. The matching may be related to the geometry of the modeled objects: the model objects having the closest shapes with the shape of the initial modeled object are proposed to the user. The retrieval relies on an efficient indexing based on designing operations applied to the modeled object within the session. Advantageously, the indexing can rely on the properties of the session, thus improving the relevance of the modeled objects retrieved in the database. Moreover, the method according to the invention facilitates the designing operations: indeed, the user can complete a modeled object with no knowledge of the database. For instance, the user can design a draft of a modeled object, and the most similar modeled objects stored in the database are retrieved and their representations are displayed to the user. Another advantage is that ergonomics of designing operations are improved as the user can design by 'single click', which drastically reduces time required for designing a modeled object.

In reference to FIG. 1, the exemplified graphical user interface (or GUI) 100 may be a typical CAD-like interface, having standard menu bars 110, 120, as well as bottom and side toolbars 140, 150. Such menu and toolbars contain a set of user-selectable icons, each icon being associated with one or more operations or functions, as known in the art.

Some of these icons are associated with software tools, adapted for editing and/or working on a modeled product 200 or objects (or parts) of product 200 such as that displayed in the GUI 100. In the following description, "product", "part", "assembly" and the like may be referred to as "part" for the sake of simplicity. Note that the concept of "part" can in fact be generalized to that of "object", wherein an object can be only a "physical" part of the designed product or, more generally, any software tool participating in the design process (but not necessarily "in" the final product).

The software tools may be grouped into workbenches. Each workbench comprises a subset of software tools. In particular, one of the workbenches is an edition workbench, suitable for editing geometrical features of the modeled product 200. In operation, a designer may for example pre-select a part of the object 200 and then initiate an operation (e.g. change the dimension, color, etc.) or edit geometrical constraints by selecting an appropriate icon. For example, typical CAD operations are the modeling of the punching or the folding of a 3D modeled object displayed on the screen.

The GUI may for example display data 250 related to the displayed product 200. In the example of FIG. 1, the data 250, displayed as a "feature tree", and their 3D representation 200 pertain to a brake assembly including brake caliper and disc. The GUI may further show various types of graphic tool 130, 400, 170, 180 for example for facilitating 3D orientation of the object, for triggering a simulation of an operation of an edited product or render various attributes of the displayed product 200, for selecting an operation to be performed. The operations may for instance be triggered via a cursor 160 in relation with a haptic device such as a mouse, or via interactions performed by the user directly on a touch sensitive device such as a touch sensitive screen able to display the GUI 100.

Figure 2:
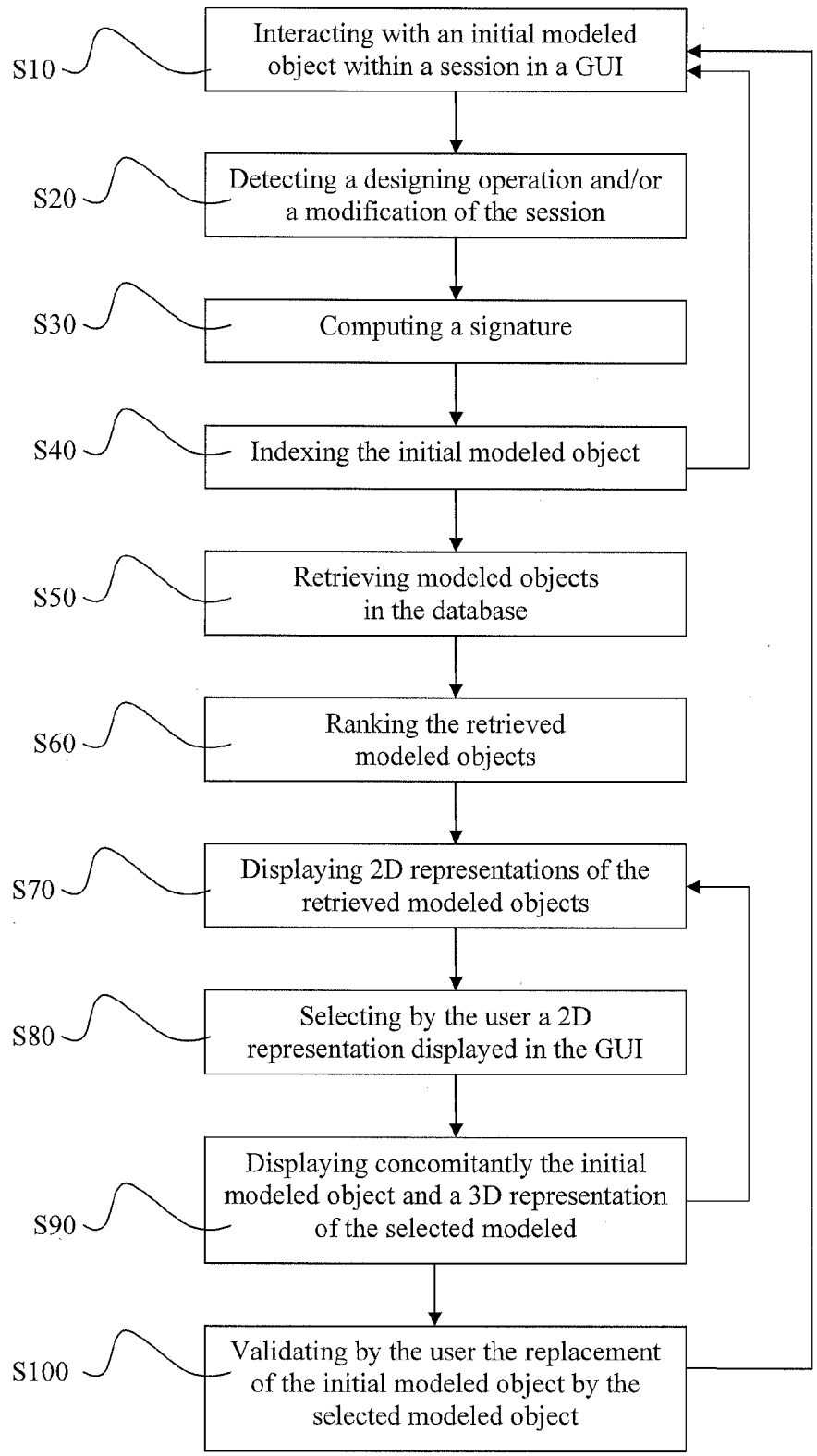
FIG. 2 is a flowchart of an embodiment of the method of the invention.

Referring now to FIG. 2, a flowchart of an embodiment of the method for designing a modeled object within a session of CAD system interacting with a database the invention is depicted.

At step S10, a user interacts with an initial modeled object within a session in a GUI. The GUI may be as the one depicted in FIG. 1. Interacting with an initial modeled object means that designing operations are performed on the object upon user action. A designing operation may consist in selecting a part of an object, editing geometrical constraints, editing geometrical feature, changing the viewpoint of the modeled object, and so on. In fact, a designing operation is carried out each time a modification occurs on the initial modeled object, and more generally on a modeled object. Interacting with the initial modeled object can also mean that a modification of the session is performed on upon user action: indeed, a modification of the session has an impact on the initial modeled object; for instance, the spatial position of an object may be determined by the session.

A session is a delimited period during which a user interacts with a system. A session is set up or established at a certain point in time, and stops at a later point in time; in general, the session starts after a user's login and stops after a user's logout. A session keeps track of operations performed by the user on the system in order to store a user context. By this way, the state of the system can be restored when the user logs in again. The user context comprises a set of information about user's relations with the system; the interactions between the user and the system can advantageously be personalized so that the system is adapted to the user's needs. A session can comprise a set of properties. For example, a profile of the user can be a property of the session. The profile consists in a collection of personal data associated to the user, such as its identity (e.g. first name, family name, nickname . . . ) and characteristics (e.g. access rights on the system, on the database, on objects . . . ). A session may also keep track of the spatial position of the object, as well as the loading of a specific workbench and/or of tool. The spatial position of the objects and the loading of a specific workbench and/or of tool can be properties of the session.

The interactions with the initial modeled object are preferably performed on a host client. A host client may be a CAD system (e.g. a computer system or workstation running a CAD application) on which the user performs designing operations. The host client interacts with the database; one could also say that the host client is in relation or connected to a server on which the database is hosted. For instance, when the user selects the initial modeled object on the host client, the initial modeled object is searched in the database on the server, sent to the host client and displayed thereon. It is to be understood that the host client and the server may be located on a same system, or located on distinct systems, as known in the art.

At step S20, a designing operation performed by a user is detected; the designing operation is applied to the initial modeled object within the session. The detection is performed as known in the art.

A modification of the session upon user action may also be detected. As discussed previously, a modification of the session has an impact on the initial modeled object loaded within the session. In practice, a property of the session such as the profile of the user, the spatial position of the object, the loading of a specific workbench and/or of tool, and so on, is modified, added, or deleted.

A modeled object may be a three-dimensional (3D) modeled object. A three-dimensional (3D) modeled object is a description of an object in a three dimensional (3D) space. A 3D space is a geometric model of a physical universe, which may be mathematically represented by a geometry which describes every point in three-dimensional space by means of coordinates. Incidentally, other ways of describing three-dimensional space exist. A 3D modeled object refers essentially to specifications, from which geometry is generated. A 3D modeled object is thus a mathematical description depicting of a 3D object, that is, a collection of points in 3D space, connected by various geometric entities such as triangles, lines, curved surfaces, etc. A 3D modeled object is represented by a 3D representation of the 3D modeled object. In general, the 3D representation is displayed in a GUI, and therefore, may be displayed in the scene—which is therefore a 3D scene. An object displayed in 3D allows its viewing from all angles. For instance, the object may be handled and turned around any its axes, or around any axis in the screen.

After that a designing operation has been detected, a signature is computed from a set of properties of the initial modeled object or from a set of properties of the session, or from a combination of both set of properties (step S30). The signature is a unique scheme or descriptor for identifying a modeled object. Any algorithm can be used for computing the signature. For instance, a shape descriptor extraction process may be used when the signature is solely computed from a set of properties of the initial modeled object, as the one depicted in the document Kazhdan, K. and Funkhouser, T., "Harmonic 3D shape matching", Full text in *International Conference on Computer Graphics and Interactive Techniques, ACM SIGGRAPH* 2002 *conference*, San Antonio, Tex., 2002, pages 191-191, ISBN:1-58113-525-4.

Alternatively, the signature may be comprised of several signatures, e.g. a first signature and a second signature. For instance, the first signature may be computed starting from a set of properties of the initial modeled object (e.g. geometrical constraints, geometrical feature, viewpoint of the modeled object), and the second signature may be computed from a set of properties of the session. It is to be understood that two different algorithms can be used for respectively computing the first and second signatures.

In practice, the signature is in the form of a matrix (e.g. of size 100) whose elements are floating numbers. Alternatively, the signature may comprise many matrices if it is made of several signatures.

Preferably, the computing of the signature(s) is performed on the client side. This advantageously limits data exchanges between the host client and the server storing the database, e.g. network's resources such as bandwidth are preserved. In addition, resources of the server are also preserved as it is not involved in the computing of the signature.

Next, at step S40, the initial modeled object is indexed in the database. The database comprises a database index storing index keys for finding model objects stored in a table of the database, as known in the art. The computed signature of the initial modeled object is used as an index key for referencing the initial modeled object in the database.

Hence, the database index is continuously completed each time the user performs a designing operation and/or a modification of the session. This amount to say that the steps S10 to S40 are continuously carried out, for instance thanks to dedicated process running in background.

Preferably, the indexing step is carried out by the server hosting the database: once the host client has computed the signature of the initial modeled object, the signature is transmitted to the server hosting the database.

Alternatively, the database may comprise of at least two database indexes. For instance, a first database index may store index keys computed from a set of properties of the initial modeled object, and a second database index may store index keys computed from a set of properties of the session. This makes it possible to uncouple information having assorted semantics, and to separately manage lifecycles and refreshes of the indexes. For instance, the first database index is only refreshed after that an edit modification has been performed while the second database index is refreshed after the modifications of a session property. It is to be understood that a database index may be divided into one or several sub-indexes. For instance, the first index could be sub-divided into an index related to geometrical properties of the modeled objects stored in the database, an index related to semantics of metadata of the modeled objects, an index related to modeled objects' materials, and so on.

Then, at step S50, modeled objects are retrieved from the database according to their respective signature. To this aim, the modeled objects having the closest signatures to the signature of initial modeled object are identified in the database. This amounts to say that the identified modeled objects have signatures that present the best matching with the signature of the initial modeled object with regard to the set of properties of the initial modeled object and/or the set of properties of the session. It is to be understood that the respective signature of each modeled object retrieved from the database has been computed in the same way as the initial modeled object.

Then, at step S60, the modeled objects retrieved from the database are ranked. The ranking may rely on the distance between the signature of each retrieved modeled objects with the signature of the initial modeled object. The distance is a value representing a degree of closeness of the signature of a retrieved modeled object with the signature of the initial modeled object. Thus, the modeled object having the closest signature amongst the signatures of the retrieved modeled objects may be at the top of the ranking while the modeled object having the farthermost signature amongst the signatures of the retrieved modeled objects may be at the bottom of the ranking Advantageously, the user can easily identify the most similar modeled object with the initial modeled object.

At this stage of the process, the server hosting the database has identified modeled objects stored in the database upon comparison between their respective signatures with the signature of the initial modeled object; modeled objects having the closest signatures with the signature of the initial object have been retrieved and ranked based on the similarity of their signature with the signature of the initial modeled object.

A representation of each retrieved modeled object is then displayed (step S70). Typically, two-dimensional (2D) representations of the modeled objects are computed. A 2D representation allows viewing the modeled object from one angle; information about the modeled object are thus described in a 2D space. The 2D representations of the retrieved modeled objects may be for instance icons.

Preferably, the computing of the representations is carried out by the server hosting the database. By this way, it is not necessary to send the modeled objects to the host client, thus allowing preservation of network resources such as bandwidth.

Once the representations have been computed, they can be displayed on the GUI, for instance within a dedicated window. A window is a visual area displayed in the GUI, as known in the art. Preferably, the representations of the retrieved modeled objects are displayed so that the ranking of the retrieved modeled objects can be graphically understood by the user. For example, the representations may be displayed the one below the other one in the ranking order in the dedicated window.

Furthermore, the representations may be displayed in accordance with the current viewpoint of the initial modeled object. That is to say, the representations are displayed with a similar position and orientation in the 3D space as the initial modeled object. In practice, several methods exist for determining a common orientation of two (or more) objects, e.g. a most well-known approach for computing the alignment of 3D objects is the principle component analysis method (PCA) which is based on the computation of moments of 3D models.

Thanks to the common orientation of the displayed representations and the initial modeled object, the user can more easily comprehend the similarity between the initial modeled object and the retrieved modeled objects, which improves and makes faster the designing process.

Then, at step S80, the user selects a modeled object among the representations of modeled objects displayed, which amounts to say that the user selects a representation of one the modeled objects retrieved in the database. The selection of the representation is performed as known in the art, e.g. by placing the cursor of a haptic device over a representation (e.g. an icon).

Once the modeled object has been selected, the step S90 is carried out: the selected modeled object is displayed, together with the initial modeled object already displayed. The selected modeled object and the initial modeled object are thus concomitantly displayed.

Preferably, the selected modeled object is displayed over the initial model object and is rendered with a certain level of transparency so that the user can see both the initial modeled object and the selected modeled object. The transparency can be adjusted by the user according to his needs. By this way, the user can easily see whether or not the selected modeled object matches with the initial modeled objects.

If the user decides to keep the selected modeled object, the user validates the replacement of the initial modeled object by the modeled object selected (step S100). At this step of the process, only the selected modeled object is displayed. On the contrary, if the user considers that the selected modeled object does not fulfil his needs, then the user does not validate the replacement, and the process may restart at step S70.

After validation of the selection, the whole process may be repeated so that the selected modeled object is in turn replaced by another modeled object retrieved in the database and selected by the user.

Figure 3:
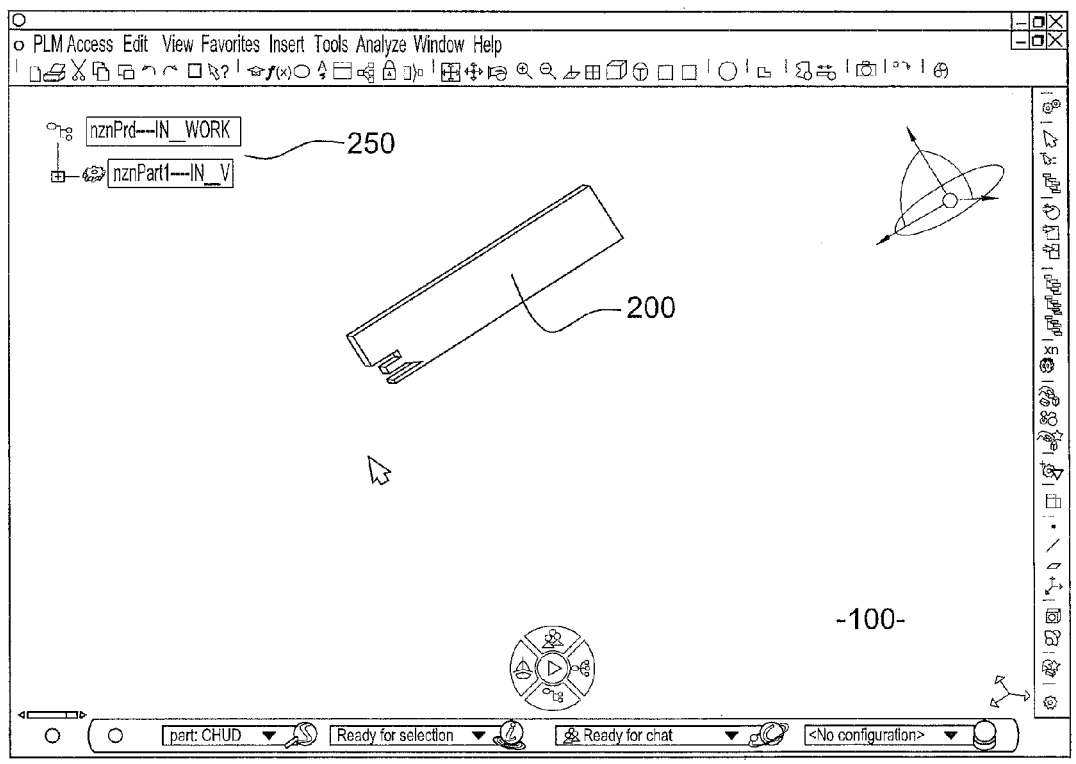
FIGS. 3-7 are schematic views depicting an embodiment of the method of the invention.

Referring now to FIG. 3, an initial three-dimensional modeled object 200 is displayed in a GUI 100 which is similar as the one depicted on FIG. 1. The GUI is part of a CAD system running on the workstation of a user, e.g. a designer. The CAD system is connected with a database wherein the modeled object 200 is stored. The initial modeled object 200 has been selected by the user. The selection of the initial modeled object may be done thanks to the use of a tree 250. It is also possible for the user to select the initial modeled object thanks to another type of user interface, for instance by inputting identification information for the initial modeled object, by selecting the initial modeled object in a list, or the like. Once selected, the modeled object is sent to the user's workstation and displayed.

Figure 4:
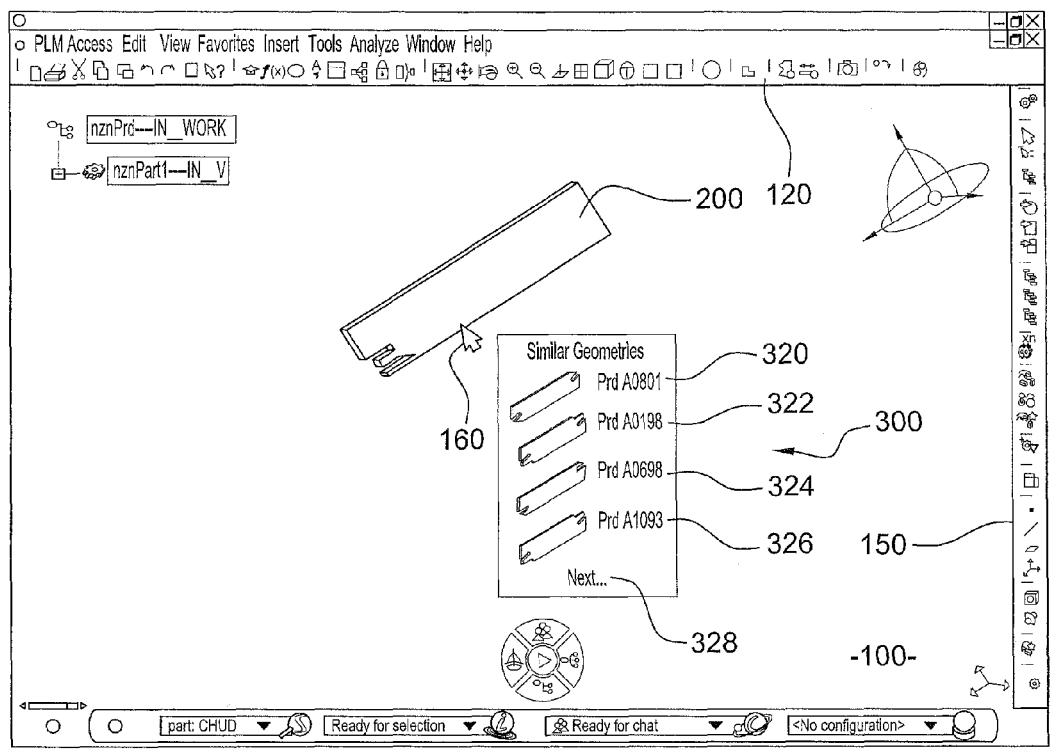

Referring now to FIG. 4, the user has performed a design operation (not shown) on the modeled object 200. The designing operation has been detected so that a signature of the modeled object 200 has been computed. The signature has been sent to the database in order to index the object 200.

The user has then performed an action in the GUI in order to inform the CAD system to search modeled objects similar the object 200; for instance by selecting with the cursor 160 a tool on a toolbar 120,150, as known in the art. As a result, the computed signature is compared with signatures already stored in the database. The modeled objects having the closest signatures to the signature of the modeled object have been retrieved in the database, and their respective 2D representations computed. Then, the 2D representations have been sent to the user's workstation.

Once received by the user's workstation, the 2D representations 320, 322, 324, 326 are displayed in the GUI 100, more precisely within a window 300. The window 300 is preferably located close to the cursor 160 so that the distance between the 2D representations contained in the window and the cursor is limited (for instance a predetermined number of pixels between boundaries of the cursor and the window); the subsequent step of selecting a 2D representation is therefore performed more quickly, and the ergonomy is improved. The 2D representations are displayed according to a ranking determined according to the similarity between the modeled object 200 and the modeled objects retrieved in the database. Incidentally, if none of the four representations displayed in the window 300 are convenient for the user, he can ask the system to show more representations of modeled objects, e.g. on selecting the menu 'next' 328. Moreover, as depicted in FIG. 4, the representations 320, 322, 324, 326 are shown with a viewpoint which is similar to the one of the object 200. It is to be understood that if the user changes the view point of the modeled object 200 while the 2D representations 320, 322, 324, 326 are displayed, the 2D representations will be recomputed in order to keep a viewpoint similar to the new one.

Figure 5:
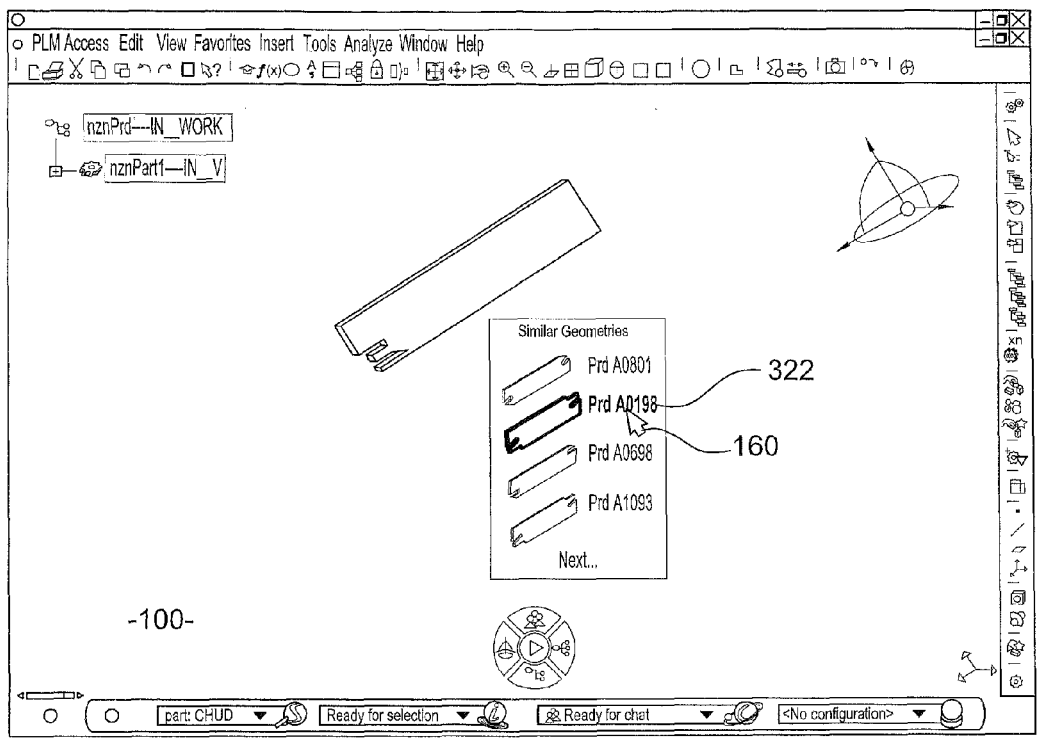

Referring now to FIG. 5, the user moves the cursor 160 over the 2D representation 322 for selecting it. As depicted in FIG. 5, the cursor 160 may be over a textual description of the represented modeled object for selecting the modeled object. In order to show that the modeled object represented by 2D representation 322 is selectable, it is highlighted.

Figure 6:
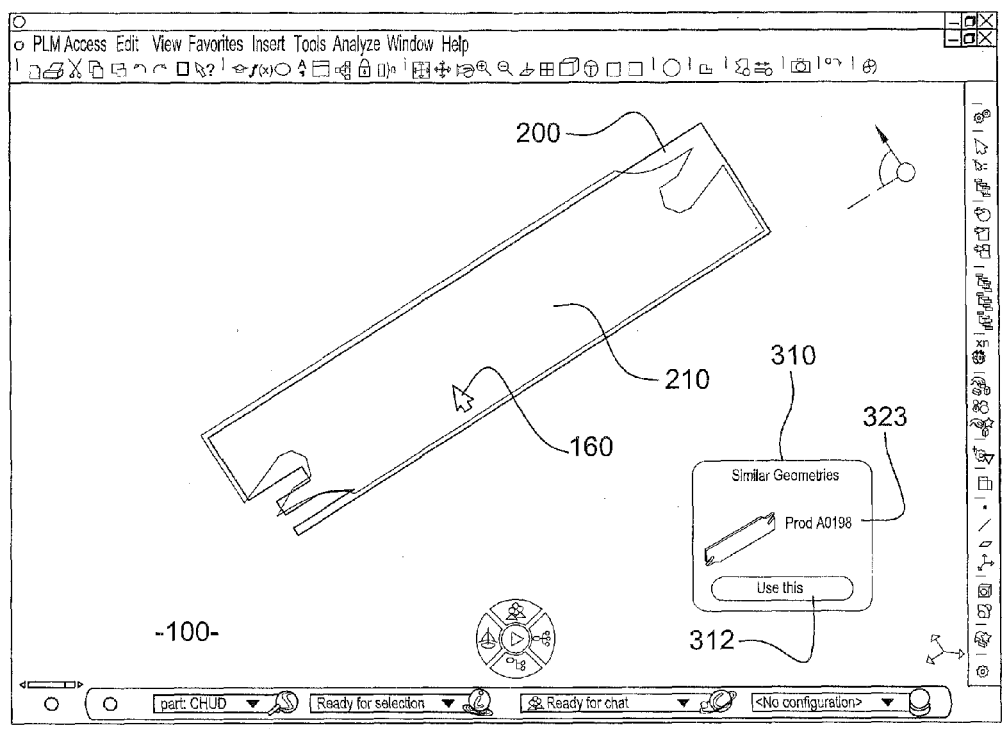

Referring now to FIG. 6, the selected modeled object is now displayed as a 3D modeled object 210 on the GUI 100. The selected modeled object is displayed over the modeled object 200, and is rendered with a respective level of transparency so that the user still sees the modeled object 200. The geometric differences between the modeled object 200 and the selected modeled object 210 can therefore be easily comprehended by the user.

Concomitantly to the selection, the window showing the 2D representations is removed, and a new window 310 is displayed in the GUI 100. The new window 310 shows a 2D representation 323 of the selected 3D modeled object 210. This 2D representation may be the same as the one 322 previously displayed in the window 300 in reference to FIG. 5. The window 310 further comprises an area 312 on which the user clicks if they wishes to replace the modeled object 200 by the selected modeled object 210.

Figure 7:
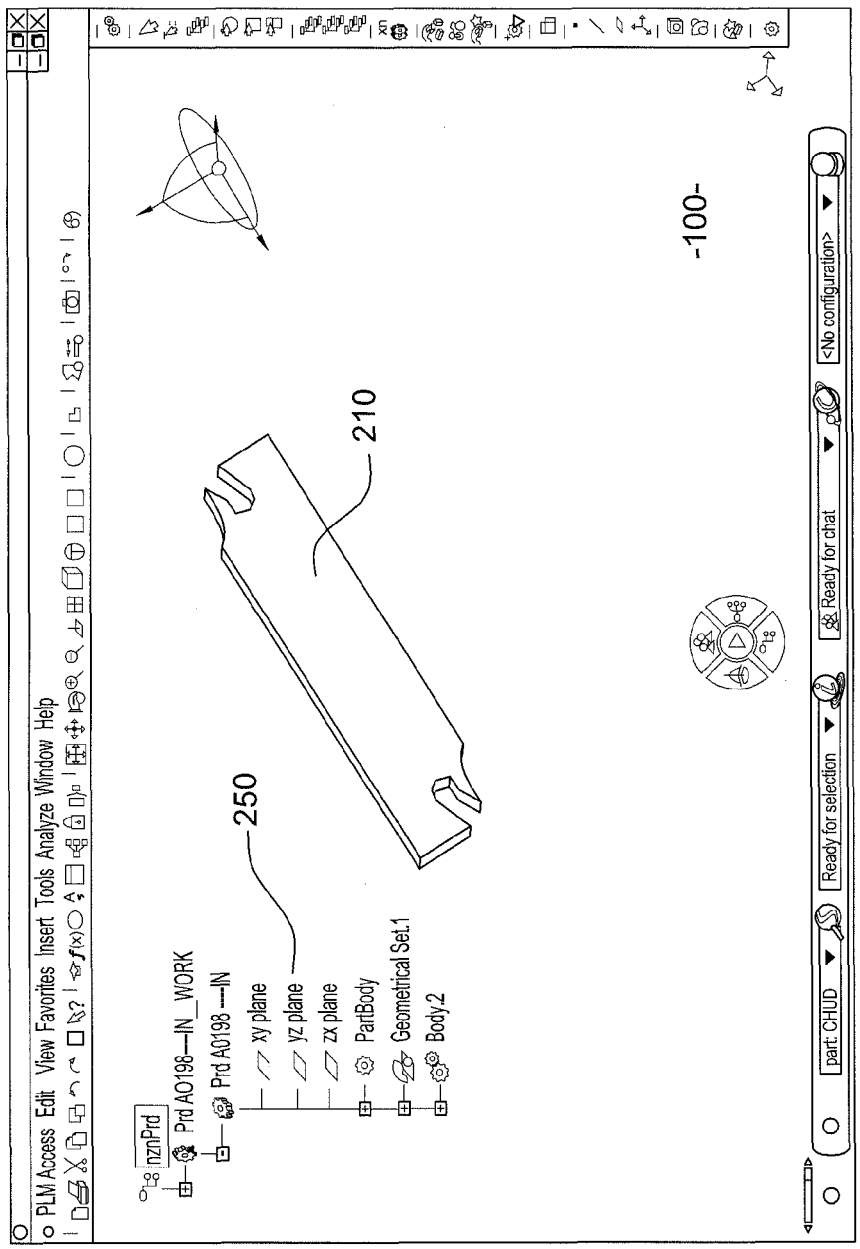

Once the user has clicked on the area 312 for validating the replacement of the modeled object 200 by the selected modeled object 210, the modeled object 200 is no more displayed and the features tree 250 has been amended for reflecting the replacement as depicted on FIG. 7. Now, the user can work on the modeled object 210 which is no more transparent. Each designing operation and/or modification of the session detected will trigger the indexing of the modeled object. The user can inform the CAD system to search modeled objects similar the modeled object 210, at any time.

It is to be understood that the foregoing method can be applied to any object in any configuration capable of being defined by a CAD/CAM/CAE system, or any system used to display views of an object. The invention may be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output.

The invention may advantageously be implemented in one or more computer programs that are executable on a programmable system including at least one programmable processor coupled to receive data and instructions from, and to transmit data and instructions to, a data storage system, at least one input device, and at least one output device. The application program may be implemented in a high-level procedural or object-oriented programming language, or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially designed ASICs (application-specific integrated circuits).

Figure 8:
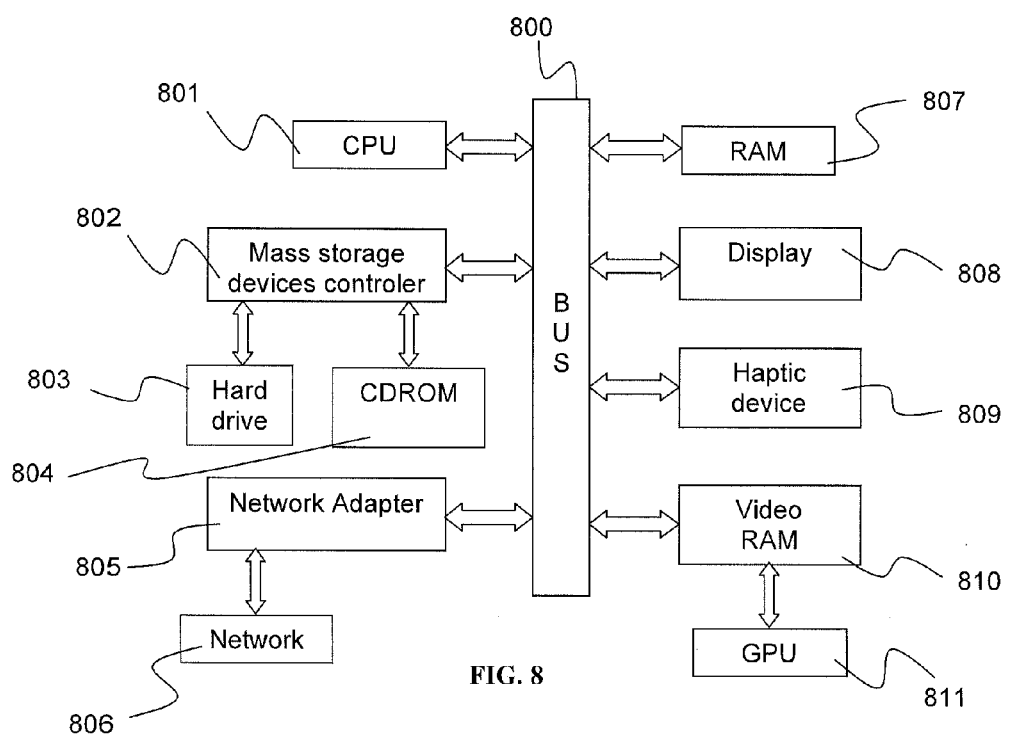
FIG. 8 is a schematic view of an embodiment of a host client workstation architecture adapted for carrying out the invention.

FIG. 8 shows a client computer system, e.g. a workstation of a user. The client computer comprises a central processing unit (CPU) 801 connected to an internal communication BUS 800, a random access memory (RAM) 807 also connected to the BUS. The client computer is further provided with a graphical processing unit (GPU) 811 which is associated with a video random access memory 810 connected to the BUS. Video RAM 810 is also known in the art as frame buffer. A mass storage device controller 802 manages accesses to a mass memory device, such as hard drive 803. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 804. Any of the foregoing may be supplemented by, or incorporated in, specially designed ASICs (application-specific integrated circuits). A network adapter 805 manages accesses to a network 806. The client computer may also include a haptic device 809 such as cursor control device, a keyboard or the like. A cursor control device is used in the client computer to permit the user to selectively position a cursor at any desired location on display 108. In addition, the cursor control device allows the user to select various commands, and input control signals. The cursor control device includes a number of signal generation devices for input control signals to system. Typically, a cursor control device may be a mouse, the button of the mouse being used to generate the signals.

The preferred embodiment of the present invention has been described. It will be understood that various modifications may be made without departing from the spirit and scope of the invention. Therefore, other implementations are within the scope of the following claims. For instance, the representations of the selected modeled objects may be 3D representations of 3D modeled objects which may be manipulated by the user.

While this invention has been particularly shown and described with references to example embodiments thereof, it will be understood by those skilled in the art that various changes in form and details may be made therein without departing from the scope of the invention encompassed by the appended claims.

The invention claimed is:

1. A method for designing a modeled object within a session of a computed-aided design system interacting with a database, the method comprising the steps of:
    detecting a designing operation performed by a user and applied to an initial modeled object within the session;
    computing a signature from a set of properties of the initial modeled object on which the designing operation has been applied and from a set of properties of the session, the set of properties of the session comprising at least a profile of the user performing the designing operation;
    retrieving from the database modeled objects having the closest signatures to the signature of the initial modeled object within the session;
    displaying representations of modeled objects retrieved;
    selecting by the user a modeled object among the representations of modeled objects displayed; and
    replacing, in a file storing the initial modeled object, the initial modeled object within the session by the modeled object selected.

2. The method of claim 1, wherein the steps are repeated for the selected modeled object replacing the initial modeled object.

3. The method of claim 1, further comprising, after the step of computing a signature, a step of:
    indexing in the database the initial modeled object.

4. The method of claim 3, wherein an index key of the initial modeled object is the computed signature of the initial modeled object.

5. The method of claim 1, wherein the step of detecting a designing operation further comprises detecting a modification of the session.

6. The method of claim 1, further comprising a step of ranking the modeled objects retrieved from the database.

7. The method of claim 6, wherein the ranking is carried out according to a distance between the signature of each retrieved modeled objects with the signature of the initial modeled object.

8. The method of claim 1, wherein the representations of the modeled objects retrieved are displayed in accordance with a current viewpoint of the initial modeled object.

9. The method of claim 1, wherein the representations of modeled objects retrieved are two-dimensional representations that are displayed within a window.

10. The method of claim 6, wherein
    the steps of detecting, computing, displaying, selecting, and replacing are performed on a client host; and
    steps of indexing in the database the initial modeled object, ranking, and retrieving are performed on a server hosting the database.

11. The method of claim 1, further comprising, after the step of selecting a modeled object by the user, the steps of:
    displaying concomitantly the selected modeled object and the initial modeled object; and
    validating, upon user action, the selection of the selected modeled object.

12. The method of claim 11, wherein the selected modeled object is displayed over the initial modeled object and is rendered with a level of transparency.

13. The method of claim 1, wherein the selected modeled object has a same orientation as the replaced initial modeled object.

14. A non-transitory computer readable storage medium having recorded thereon a computer program, wherein the computer program comprises instructions for execution by a computer, the instructions comprising code means for causing the computer to take the steps of:
    detecting a designing operation performed by a user and applied to an initial modeled object within the session;
    computing a signature from a set of properties of the initial modeled object on which the designing operation has been applied and from a set of properties of the session, the set of properties of the session comprising at least a profile of the user that performs the designing operation;
    retrieving in the database modeled objects having the closest signatures to the signature of the initial modeled object within the session;
    displaying representations of modeled objects retrieved;

selecting by the user a modeled object among the representations of modeled objects displayed; and replacing, in a file storing the initial modeled object, the initial modeled object within the session by the modeled object selected.

15. An apparatus for designing a modeled object within a session of CAD system interacting with a database, the apparatus comprising:

a database storing modeled objects;

a display for displaying representations of modeled objects;

at least one processing unit operable to:

detect a designing operation performed by a user and applied to an initial modeled object within the session;

compute a signature from a set of properties of the initial modeled object on which the designing operation has been applied and from a set of properties of the session, the set of properties of the session comprising at least a profile of the user that performs the designing operation;

retrieve in the database modeled objects having the closest signatures to the signature of the initial modeled object within the session;

display on the display representations of modeled objects retrieved;

effect selection by the user a modeled object among the representations of modeled objects displayed; and replace, in a file storing the initial modeled object, the initial modeled object within the session by the modeled object selected.

\* \* \* \* \*